(12) United States Patent
Takahashi

(10) Patent No.: US 11,327,576 B2
(45) Date of Patent: May 10, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Kei Takahashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/756,592

(22) PCT Filed: Sep. 10, 2018

(86) PCT No.: PCT/JP2018/033401
§ 371 (c)(1),
(2) Date: Apr. 16, 2020

(87) PCT Pub. No.: WO2019/082527
PCT Pub. Date: May 2, 2019

(65) Prior Publication Data
US 2020/0241656 A1    Jul. 30, 2020

(30) Foreign Application Priority Data
Oct. 23, 2017  (JP) .............................. JP2017-204162

(51) Int. Cl.
*G06F 3/0346* (2013.01)
*G06F 3/01* (2006.01)

(52) U.S. Cl.
CPC ............ *G06F 3/0346* (2013.01); *G06F 3/011* (2013.01); *G06F 3/017* (2013.01)

(58) Field of Classification Search
CPC ......... G06F 3/0346; G06F 3/011; G06F 3/017
See application file for complete search history.

(56) References Cited

U.S. PATENT DOCUMENTS

| 9,164,588 | B1 * | 10/2015 | Johnson | ................ G06F 3/017 |
| 10,079,027 | B2 * | 9/2018 | Thoen | ................ G10L 21/0356 |
| 2012/0114132 | A1 * | 5/2012 | Abrahamsson | ......... H04S 7/304 381/74 |

FOREIGN PATENT DOCUMENTS

JP        2014086038 A    *  5/2014

* cited by examiner

*Primary Examiner* — Kenneth B Lee, Jr.
(74) *Attorney, Agent, or Firm* — Paratus Law Group, PLLC

(57) ABSTRACT

Provided is an information processing apparatus including an information request unit, in a case in which a predetermined trigger signal is detected in a first sensor, requesting second detection information based on a signal detected in a second sensor located at a different position from that of the first sensor, a local communication unit receiving the second detection information, and a processing determination unit determining processing to be executed based on first detection information based on a signal detected in the first sensor and the second detection information. Power consumption can be further suppressed in an information processing apparatus in which sensors are provided at different positions.

20 Claims, 9 Drawing Sheets

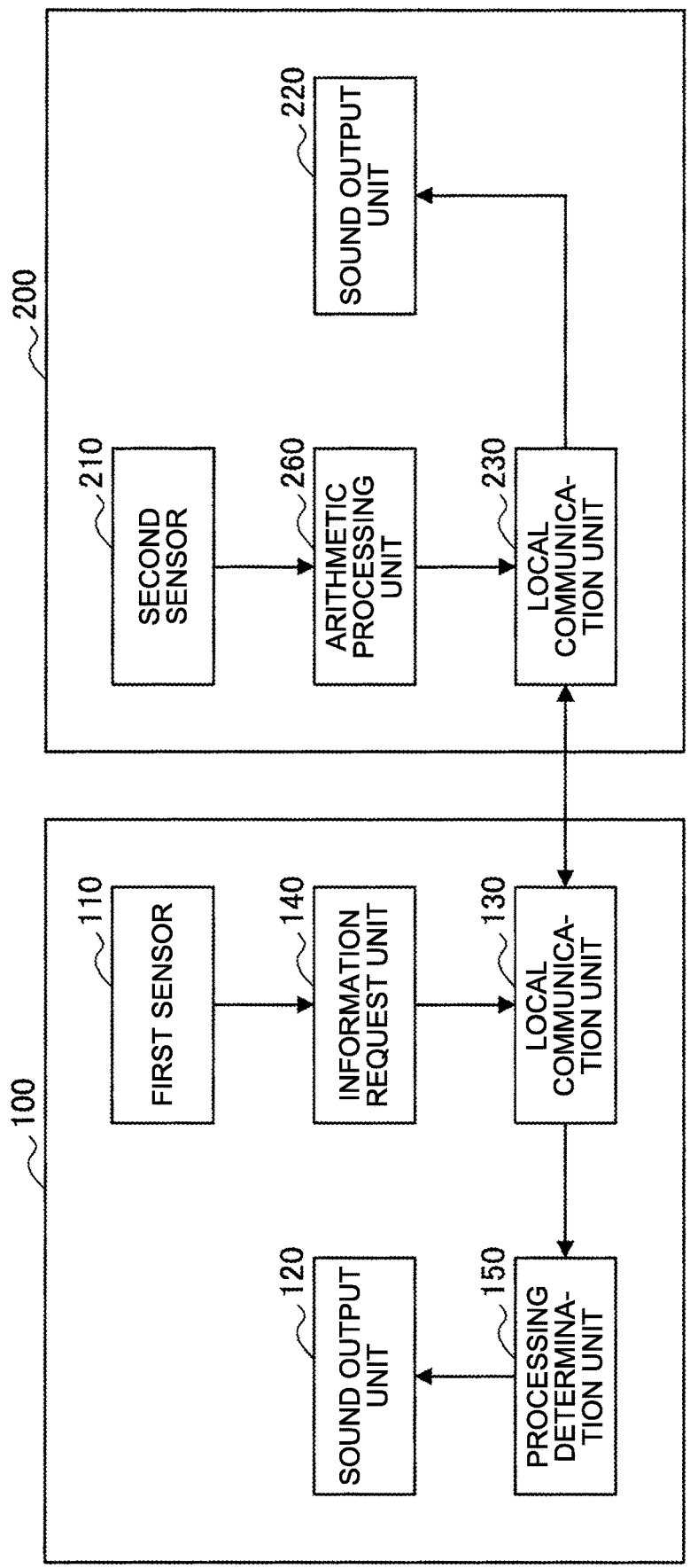

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/033401 (filed on Sep. 10, 2018) under 35 U.S.C. § 371, which claims priority to Japanese Patent Application No. 2017-204162 (filed on Oct. 23, 2017), which are all hereby incorporated by reference in their entirety.

FIELD

The present disclosure relates to an information processing apparatus, an information processing method, and a program.

BACKGROUND

In recent years, various wearable terminals such as an eyeglasses-type terminal and a watch-type terminal have been developed. For example, Patent Literature 1 discloses a wristband-type display control apparatus including a control unit, an input unit, a sensor unit, a storage unit, a communication unit, a display unit, and the like. Also, Patent Literature 2 discloses an electronic device suppressing power consumption of the device to enable the life of a battery to be extended.

In particular, Patent Literature 2 discloses the electronic device provided with a sensor consuming normal power and a sensor consuming less power. In the electronic device disclosed in Patent Literature 2, the timings of use of these sensors are switched to suppress power consumption.

CITATION LIST

Patent Literature

Patent Literature 1: JP 2015-125616 A
Patent Literature 2: WO 2009/008411 A

SUMMARY

Technical Problem

However, in Patent Literature 1 and 2 described above, a technique for suppressing power consumption has not been studied for an electronic device provided with sensors at different positions. In such an electronic device, since detection data and the like are transmitted and received between the sensors at the different positions, for example, a more detailed study for suppressing power consumption has been required.

Therefore, there has been a demand for a technique for further suppressing power consumption in an information processing apparatus in which sensors are provided at different positions.

Solution to Problem

According to the present disclosure, an information processing apparatus is provided that includes: an information request unit, in a case in which a predetermined trigger signal is detected in a first sensor, requesting second detection information based on a signal detected in a second sensor located at a different position from that of the first sensor; a local communication unit receiving the second detection information; and a processing determination unit determining processing to be executed based on first detection information based on a signal detected in the first sensor and the second detection information.

Moreover, according to the present disclosure, an information processing method is provided that includes: in a case in which a predetermined trigger signal is detected in a first sensor, requesting second detection information based on a signal detected in a second sensor located at a different position from that of the first sensor; receiving the second detection information; and determining, by means of an arithmetic processing device, processing to be executed based on first detection information based on a signal detected in the first sensor and the second detection information.

Moreover, according to the present disclosure, a program is provided that causes a computer to function as: an information request unit, in a case in which a predetermined trigger signal is detected in a first sensor, requesting second detection information based on a signal detected in a second sensor located at a different position from that of the first sensor; a local communication unit receiving the second detection information; and a processing determination unit determining processing to be executed based on first detection information based on a signal detected in the first sensor and the second detection information.

According to the present disclosure, since information detected in a second sensor is received after a trigger signal is detected in a first sensor, the frequency of communication between the first sensor and the second sensor located at different positions can be reduced.

Advantageous Effects of Invention

As described above, according to the present disclosure, it is possible to further suppress power consumption in an information processing apparatus in which sensors are provided at different positions.

Meanwhile, effects are not necessarily limited to the above effects. In addition to or instead of the above effects, any effects described in the present description or other effects that can be construed from the present description may be exerted.

BRIEF DESCRIPTION OF DRAWINGS

FIG. 2 illustrates a configuration of the information processing apparatus according to the embodiment.

DESCRIPTION OF EMBODIMENTS

A preferred embodiment of the present disclosure will be described below in detail with reference to the attached drawings. Meanwhile, in the present description and drawings, components having a substantially equal functional configuration are labeled with the same reference signs, and description of the duplicate components is omitted.

Note that description will be provided in the following order.

<Embodiment>
1. Example of External Appearance of Information Processing Apparatus
2. Configuration of Information Processing Apparatus
3. Processing Operation of Information Processing Apparatus
  3.1. Case in Which Second Sensor is Activated Before Detection of Trigger Signal
  3.2. Case in Which Second Sensor is Activated After Detection of Trigger Signal
  3.3. Case in Which Gesture Distinction is Performed Plural Times
4. Modification Examples

Embodiment

[1. Example of External Appearance of Information Processing Apparatus]

First, an example of an external appearance of an information processing apparatus according to an embodiment of the present disclosure will be described with reference to FIG. 1. Information processing apparatuses 100 and 200 according to the present embodiment include a first sensor and a second sensor located at a different position from that of the first sensor, and a trigger signal detected in the first sensor triggers start of communication between the information processing apparatuses 100 and 200.

Figure 1:
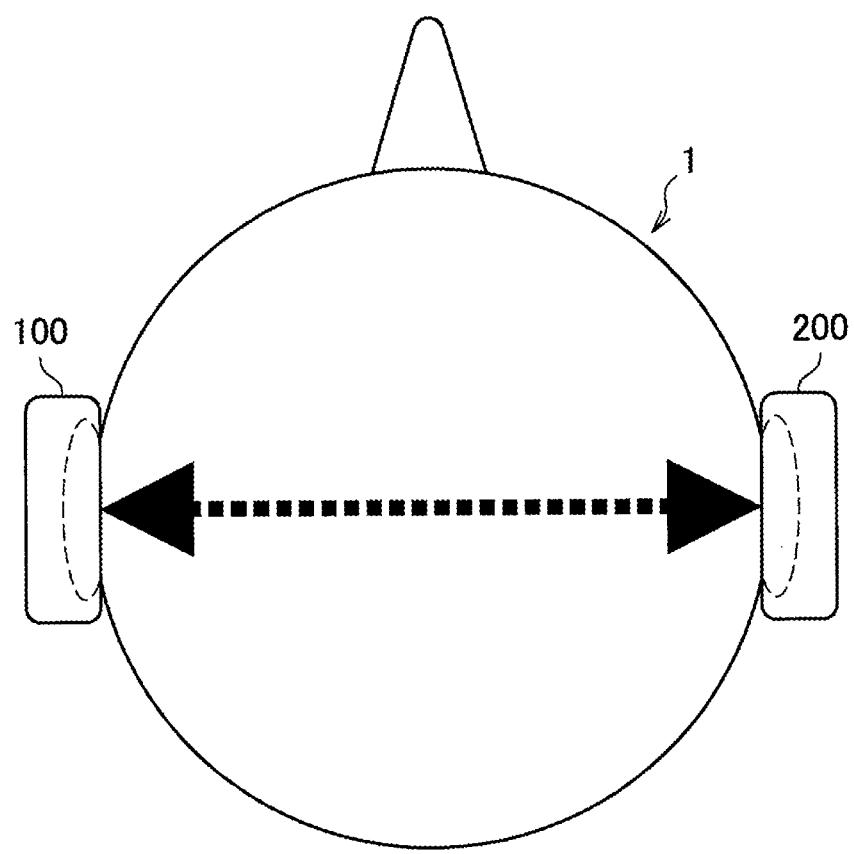
FIG. 1 is a cross-sectional view illustrating an external appearance of an information processing apparatus according to an embodiment of the present disclosure.

An example of the information processing apparatus in which the first sensor and the second sensor are located at different positions can be a wearable terminal in which headset units are separated on the right and left sides (for example, inner-ear-type headphones), out of wearable terminals to be worn on the ears of a user 1, such as earphones, a headset, and headphones, as illustrated in FIG. 1. Such a wearable terminal may have, for example, a sound reproduction function. Examples of the sound reproduction function can be a music reproduction function and a news reading function.

However, although FIG. 1 illustrates the wearable terminal in which the headset units are separated on the right and left sides, the mode of the information processing apparatuses 100 and 200 is not limited as long as the first sensor and the second sensor are located at different positions. The information processing apparatuses 100 and 200 may be terminals to be worn on the body of the user 1 or stationary terminals. Alternatively, the information processing apparatuses 100 and 200 may have a mode in which the first sensor is provided in a terminal to be worn by the user while the second sensor is provided in a stationary terminal. Since the first sensor and the second sensor are located at different positions, the information processing apparatuses 100 and 200 detect information to be detected at different positions. Consequently, the information processing apparatuses 100 and 200 can collect information in a wider range and improve detection accuracy.

Furthermore, as other modes of the information processing apparatus according to the present embodiment than the wearable terminal to be worn on the ears, a head mounted display (HMD) and a neckband-type terminal to be placed over the shoulders can be illustrated.

Also, although FIG. 1 illustrates the wearable terminal having the sound reproduction function, the information processing apparatus according to the present embodiment may be a terminal having a visual output function such as a video reproduction function instead of the terminal having the auditory output function. Further, the information processing apparatus according to the present embodiment may be a terminal having a tactile output function or a terminal having an olfactory output function. With such a configuration, the information processing apparatus according to the present embodiment can provide various types of feedback to the user.

Hereinbelow, description will be provided, taking a wearable terminal having a sound reproduction function as illustrated in FIG. 1 as an example of an information processing apparatus according to the present embodiment.

As illustrated in FIG. 1, the information processing apparatuses 100 and 200 are worn on the ears of the user 1 and are connected to enable wireless communication. With this configuration, since the information processing apparatuses 100 and 200 can be worn separately, the degree of freedom of wearing by the user 1 can be increased, and the convenience for the user 1 can be improved. However, it is to be understood that information exchange between the information processing apparatuses 100 and 200 may be done through wired communication.

Each of the information processing apparatuses 100 and 200 includes a sensor. Specifically, the information processing apparatus 100 includes a first sensor 110, and the information processing apparatus 200 includes a second sensor 210. The information processing apparatuses 100 and 200 can determine processing to be executed based on signals detected in the first sensor 110 and the second sensor 210 by communicating with each other, respectively. In addition, the information processing apparatuses 100 and 200 can reduce power consumption by controlling the timings of communication between the information processing apparatuses 100 and 200. This will be described in detail below.

Note that the information processing apparatuses 100 and 200 may include an input mechanism for acquiring a user operation such as a button, a touch sensor, and a proximity sensor. The input mechanism for acquiring a user operation may be provided on each of the right and left sides in a case in which the paired terminals are separated on the right and left sides as illustrated in FIG. 1.

[2. Configuration of Information Processing Apparatus]

Next, specific configurations of the information processing apparatuses 100 and 200 according to the present embodiment will be described with reference to FIG. 2. First, the configuration of the information processing apparatus 100 will be described. The information processing apparatus 100 includes the first sensor 110, a sound output unit 120, a local communication unit 130, an information request unit 140, and a processing determination unit 150.

The first sensor 110 includes various sensors detecting information about the information processing apparatus 100 or an external environment. For example, the first sensor 110 may include an acceleration sensor. The acceleration sensor can measure gravitational acceleration applied to the information processing apparatus 100 and acquire sensor data (acceleration data) indicating the magnitude and direction of the gravitational acceleration. The first sensor 110 may also include a sensor detecting an angular velocity such as a gyro sensor. According to these types of sensors, the first sensor 110 detects a change in posture or motion of the information processing apparatus 100 to enable a change in posture or motion of the user 1 wearing the information processing apparatus 100 to be detected.

The first sensor 110 may also include a visible camera or an infrared camera such as an imaging device. For example, the first sensor 110 may be a visible camera that can detect that the user 1 has started gazing and detect a gazing point of the user 1 by detecting a movement of his/her pupil. Also, in a case in which the first sensor 110 is an infrared camera, the first sensor 110 can detect a slight movement performed by the user 1 such as a pupil movement or an internal state, as well as an external state, of the user 1.

Further, the first sensor 110 may be a sensor detecting voice (i.e., a microphone). With this configuration, the first sensor 110 can detect an input from the user 1 as voice even in an environment in which the user 1 cannot move.

In the present embodiment, the first sensor 110 (and the second sensor 210 described below) can detect a gesture that the user 1 performs with use of his/her part on which the information processing apparatuses 100 and 200 are worn.

Figure 3A:
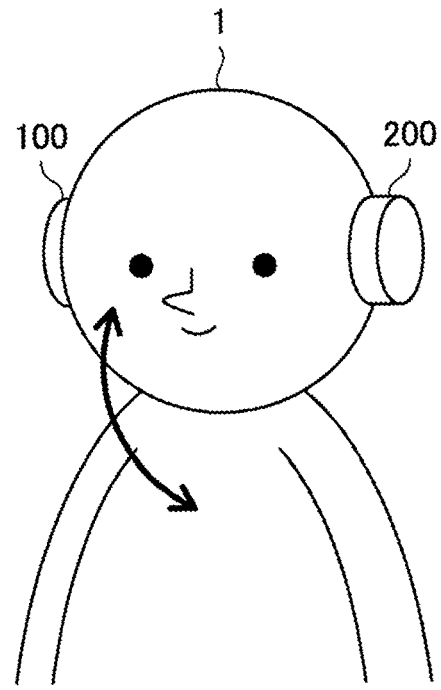
FIG. 3A illustrates a gesture detected in the information processing apparatus according to the embodiment as an example.
Figure 3B:
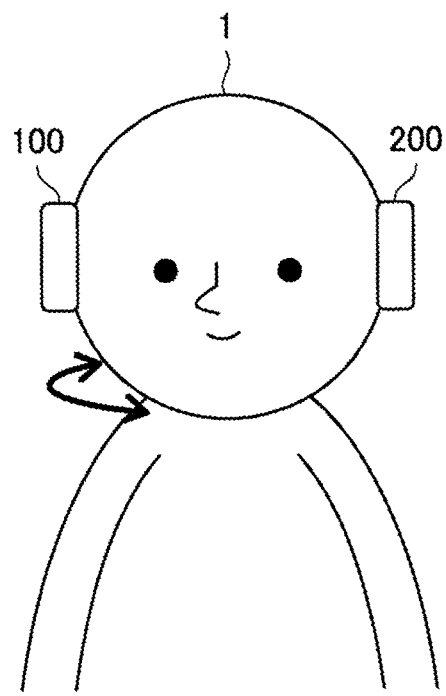
FIG. 3B illustrates a gesture detected in the information processing apparatus according to the embodiment as another example.
Figure 3C:
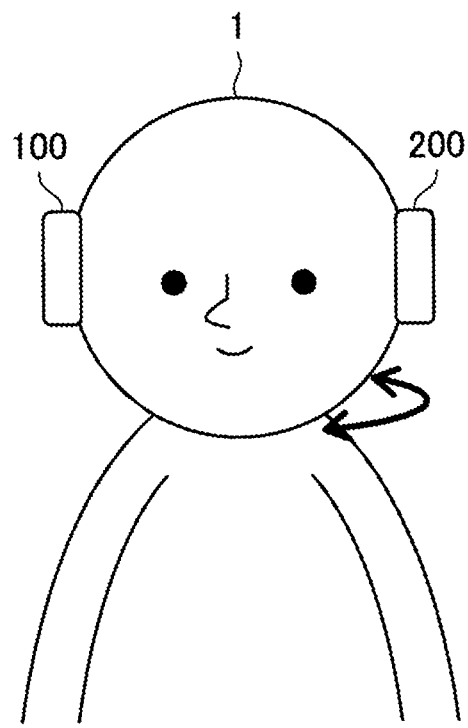
FIG. 3C illustrates a gesture detected in the information processing apparatus according to the embodiment as another example.

An example of the gesture detected in the first sensor 110 will be described with reference to FIGS. 3A to 3C. First, FIG. 3A illustrates a state in which the headset-type information processing apparatuses 100 and 200 are worn on both the ears of the user 1, respectively, and in which a nod, in which the user 1 moves his/her neck back and forth, is detected. FIGS. 3B and 3C illustrate states in which the headset-type information processing apparatuses 100 and 200 are worn on both the ears of the user 1, respectively, in a similar manner to that in FIG. 3A, and in which a movement in which the user 1 inclines his/her head to the right side and the left side is detected. In this manner, the first sensor 110 (and the second sensor 210 described below) can detect various gestures that the user 1 performs with use of his/her head on which the information processing apparatuses 100 and 200 are worn.

The information request unit 140 has a function, in a case in which a predetermined trigger signal is detected in the first sensor 110, to request second detection information based on a signal detected in the second sensor 210 located at a different position from that of the first sensor 110. Information exchange between the first sensor 110 and the information processing apparatus 200 including the second sensor 210 is performed via the local communication units 130 and 230. The second sensor 210, the information processing apparatus 200, and an operation flow of information exchange by these components will be described below.

Here, the second detection information based on the signal detected in the second sensor 210 may be, for example, sensor data detected in the second sensor 210 or a parameter obtained by performing arithmetic processing on the sensor data detected in the second sensor 210. For example, in a case in which the second sensor 210 is an acceleration sensor, a gyro sensor, or the like, as in the case of the first sensor 110, the second detection information may be sensor data (acceleration data) indicating the magnitude and direction of the gravitational acceleration detected in the acceleration sensor, the gyro sensor, or the like. Also, the second detection information may be sensor data obtained by converting actually measured sensor data (acceleration data) in order for at least either a frequency or a resolution to be reduced. Further, the second detection information may be data for various parameters such as a frequency, a resolution, and a norm calculated from actually measured sensor data (acceleration data). With this configuration, since the communication volume of the second detection information that the information processing apparatus 100 is to receive can be reduced, the power consumption of the information processing apparatus 100 can be suppressed.

Also, the predetermined trigger signal is a signal for detecting a gesture input from the user 1 in the information processing apparatus 100. The trigger signal may be any signal as long as the trigger signal enables the gesture input to be detected from the daily actions of the user 1. Note that the trigger signal may have a low ignition point (that is, a threshold value for starting driving of the information request unit 140) in order to improve the detection sensitivity of the gesture input.

The local communication unit 130 has a function of communicating with the information processing apparatus 200. The local communication unit 130 may perform, for example, direct one-to-one communication with the information processing apparatus 200, or may perform communication via a network. The form of communication by the local communication unit 130 is not particularly limited, and may be short-range wireless communication such as Near Field Magnetic Interface (NFMI) or wired communication. The local communication unit 130 may be an interface and a circuit that perform the above-described communication.

The processing determination unit 150 determines processing to be executed based on first detection information based on a signal detected in the first sensor 110 and the second detection information. Specifically, the processing determination unit 150 determines processing to be executed based on first detection information based on a signal detected in the first sensor 110 and the second detection information based on a signal detected in the second sensor 210 that the processing determination unit 150 has received via the local communication unit 130.

The first detection information based on the signal detected in the first sensor 110 may include the aforementioned information collected in the first sensor 110. For example, the first detection information may be information about the acceleration, the sound, or the like detected in the first sensor 110. For example, in a case in which the first sensor 110 is an acceleration sensor, a gyro sensor, or the like, the first detection information may be sensor data (acceleration data) indicating the magnitude and direction of the gravitational acceleration actually detected in the first sensor 110. Also, in a case in which the first sensor 110 is a sensor such as a visible camera and an infrared camera, the first detection information may be information or the like about the direction of the line of sight or the period during which the line of sight is fixed. Further, in a case in which the first sensor 110 is a sensor detecting a sound, the first detection information may be a sound frequency, a waveform, a sound generation time, or the like. That is, the first detection information may be any data detected in the first sensor 110.

The processing determination unit 150 distinguishes classification of an input based on the aforementioned first detection information and second detection information and determines processing to be executed in accordance with the distinguished classification of the input. The processing determination unit 150 also outputs the determined processing to the sound output unit 120.

Specifically, for example, in a case in which the first sensor 110 and the second sensor 210 are acceleration sensors and detect a nodding gesture of the user 1, the processing determination unit 150 uses information about the gesture of the user 1 as the first detection information. For example, the magnitude and direction of the gravitational acceleration collected in the first sensor 110 can be used as the first detection information. Also, the magnitude and direction of the gravitational acceleration collected in the second sensor 210 at a different position from that of the first sensor 110 can be used as the second detection information.

Here, the information processing apparatuses 100 and 200 worn on both the ears can be provided with a certain distance. Therefore, for example, in a case in which the information processing apparatuses 100 and 200 worn on both the ears detect a nodding gesture, the first sensor 110 and the second sensor 210 can indicate similar values for the magnitude and direction of the acceleration.

On the other hand, for example, in a case in which the information processing apparatuses 100 and 200 worn on both the ears detect a gesture of inclining the head to the right side or the left side, the first sensor 110 and the second sensor 210 can indicate different values for the magnitude and direction of the acceleration. Specifically, in the gesture of inclining the head to the left side, for example, the movement of the head on the left side is small, and the movement of the head on the right side is large. Therefore, the magnitude of the acceleration that can be collected in the acceleration sensor worn on the left ear is smaller than that of the acceleration sensor worn on the right ear, and the direction of the acceleration is a head-down direction. On the other hand, the magnitude of the acceleration that can be collected in the acceleration sensor worn on the right ear is larger than that of the acceleration sensor worn on the left ear, and the direction of the acceleration is a head-up direction. More specifically, in the gesture of inclining the head to the left side, the information processing apparatus 100 worn on the right ear detects acceleration in the head-down direction after indicating acceleration in the head-up direction, and the information processing apparatus 200 worn on the left ear detects acceleration in the head-up direction after indicating acceleration in the head-down direction. On the other hand, in a case in which the entire body jumps, both the information processing apparatus 100 worn on the right ear and the information processing apparatus 200 worn on the left ear detect acceleration in the head-down direction after indicating acceleration in the head-up direction. As described above, although it may be difficult to distinguish between the jumping motion and the gesture of inclining the head to the left side only by the movement of the information processing apparatus 100 worn on the right ear, the distinction can be made by using the first detection information and the second detection information detected in the right and left sensors 110 and 210 of the information processing apparatus 100 worn on the right ear and the information processing apparatus 200 worn on the left ear.

In this manner, the processing determination unit 150 can distinguish the gesture performed by the user 1 by using the first detection information and the second detection information detected in the first sensor 110 and the second sensor 210, respectively. The processing determination unit 150 can also determine processing to be executed in the information processing apparatuses 100 and 200 in accordance with the distinguished classification of the gesture.

The processing to be executed in the information processing apparatuses 100 and 200 may be processing depending on the type of the terminal. For example, in a case in which the information processing apparatuses 100 and 200 are sound reproduction apparatuses, the processing may be any instruction regarding sound reproduction. More specifically, in a case in which the information processing apparatuses 100 and 200 are music reproduction apparatuses, processing corresponding to the nodding gesture may be reproduction processing or stop processing of a track, and processing corresponding to the head-inclining gesture may be track forwarding processing or track returning processing. At this time, the gesture of inclining the head to the left side may correspond to the track returning processing, and the gesture of inclining the head to the right side may correspond to the track forwarding processing. The processing to be executed in the information processing apparatuses 100 and 200 is not limited to the examples described above but may be any processing. Also, the processing to be executed in the information processing apparatuses 100 and 200 may be processing for causing another external terminal to execute processing.

In this manner, the processing determination unit 150 determines processing to be executed based on the first detection information and the second detection information. Although the example illustrated above is an example in which the first detection information and the second detection information are information about the gesture of the user 1, and in which the processing to be executed is processing regarding track reproduction in the sound reproduction apparatus, the present embodiment is not particularly limited to this example. For example, the information processing apparatuses 100 and 200 may include an image output unit instead of the sound output unit 120. Specifically, the information processing apparatuses 100 and 200 may be HMDs and may execute any processing regarding video reproduction based on various gesture motions.

For distinction of classification of an input such as a gesture, a machine learning algorithm using deep learning may be used, for example. For example, in the gesture input, the size, the movement, or the time of the gesture differs depending on the users 1. By using the machine learning algorithm, the gesture can be recognized regardless of the individual difference of each of the users 1, and the gesture of each of the users 1 can thus be distinguished with higher accuracy.

Note that the processing determination unit 150 can execute the above-described control by cooperation of software and hardware, for example. For example, the processing determination unit 150 may be a computer and may execute the control by executing a program stored in a memory or another storage medium. Specifically, the processing determination unit 150 may include a central processing unit (CPU), a micro processing unit (MPU), a graphic processing unit (GPU), a digital signal processor (DSP), or the like as hardware.

The sound output unit 120 has a function of performing the processing determined in the processing determination unit 150. For example, the sound output unit 120 may be a loudspeaker and may output a content sound, an operation sound, or the like. For example, the sound output unit 120 may reproduce and stop a track, or move forward to the next track and return to the previous track, in accordance with the processing determined in the processing determination unit 150. With such a configuration, since the user 1 can directly confirm as sound output the operation input by means of the gesture, the user 1 can save the effort of visually confirming the operation.

Meanwhile, although the sound output unit 120 executes processing regarding a sound, the sound output unit 12 may execute processing other than processing regarding a sound as long as the processing is processing determined in the processing determination unit 150. For example, the processing may be an operation of controlling another device such as turning on a light and unlocking a smart lock. Also, in a case in which the information processing apparatuses 100 and 200 are HMDs, an image output unit may be provided instead of the sound output unit 120, and processing regarding video may be executed.

Next, the information processing apparatus 200 will be described. The information processing apparatus 200 includes the second sensor 210, an arithmetic processing unit 260, the local communication unit 230, and a sound output unit 220. In the present embodiment, after the information request unit 140 provided in the information processing apparatus 100 requests the information processing apparatus 200 for the second detection information based on a signal detected in the second sensor 210, communication occurs between the information processing apparatuses 100 and 200. Since the linked operation among the user 1 and the information processing apparatuses 100 and 200 will be described below, respective components of the information processing apparatus 200 will be described first.

Since the configuration of the local communication unit 230 is substantially similar to that of the local communication unit 130 in the information processing apparatus 100, and the configuration of the sound output unit 220 is substantially similar to that of the sound output unit 220 in the information processing apparatus 100, description thereof is omitted here.

The second sensor 210 includes various sensors detecting information about the information processing apparatus 200 or an external environment. As the second sensor 210, any sensor may be used in a similar manner to the first sensor 110. For example, the second sensor 210 may include an acceleration sensor. The acceleration sensor can measure gravitational acceleration applied to the information processing apparatus 200 and collect sensor data (acceleration data) indicating the magnitude and direction of the gravitational acceleration. According to these types of sensors, the second sensor 210 detects a change in posture or motion of the information processing apparatus 200 to enable a change in posture or motion of the user 1 wearing the information processing apparatus 200 to be detected. Further, the second sensor 210 may detect a movement of the eyes of the user 1 or the like as a movement of the user 1. For example, the second sensor 210 may be a sensor capable of detecting a movement of the pupil such as a visible camera or an infrared camera. In a case in which the second sensor 210 is a visible camera, an infrared camera, or the like, the second sensor 210 can detect the line of sight, that the user 1 is gazing, and the gazing point of the user 1. Data collected in the second sensor 210 is output to, for example, the arithmetic processing unit 260.

As described above, any sensor may be used as the first sensor 110 and the second sensor 210. However, the same type of sensor may be used for the first sensor 110 and the second sensor 210. For example, in a case in which at least one of the first sensor 110 and the second sensor 210 is a gyro sensor, the amount of change in angular velocity can be detected, and the processing determination unit 150 can thus distinguish the gesture of the user 1. Also, in a case in which both the first sensor 110 and the second sensor 210 are gyro sensors, more accurate gesture distinction can be performed by using a plurality of pieces of detection information from a plurality of gyro sensors.

For example, in a case in which the first sensor 110 and the second sensor 210 are acceleration sensors, the acceleration sensors are provided at different positions, and more accurate gesture distinction, which is difficult for a single acceleration sensor to accomplish, can thus be performed. Specifically, by using a plurality of acceleration sensors provided at different positions, it is possible to obtain similar detection information to that in the case of using the gyro sensor. According to this configuration, since it is possible to obtain a similar detection result to that in the case of using the gyro sensor by using the acceleration sensor, which consumes much less power than the gyro sensor, power consumption in the first sensor 110 and the second sensor 210 can be suppressed.

Further, as described above, in a case in which the acceleration sensors of the same type are provided in the first sensor 110 and the second sensor 210 in the information processing apparatuses 100 and 200, for example, not only the gesture by the user 1 but also an operation of turning or twisting the information processing apparatuses 100 and 200 themselves can be detected. In the present embodiment, by utilizing the difference in acceleration between the information processing apparatuses 100 and 200 worn on both the ears, it is possible to detect whether the detected signal is based on the movement of the entire head wearing the information processing apparatuses 100 and 200 or the operation of twisting the information processing apparatuses 100 and 200 themselves.

For example, in a case in which the operation of turning or twisting the information processing apparatuses 100 and 200 themselves is performed, the magnitude of the acceleration data collected in the first sensor 110 and the second sensor 210 is much larger than that for the movement in which the user 1 inclines his/her head or nods. Therefore, the processing determination unit 150 can determine whether the performed operation is an operation to the information processing apparatuses 100 and 200 themselves or a gesture based on the difference in the magnitude of the acceleration values collected in the first sensor 110 and the second sensor 210.

The arithmetic processing unit 260 has a function of generating second detection information based on a signal detected in the second sensor 210 and outputting the second detection information to the local communication unit 230.

For example, the second detection information may be a part of a signal detected in the second sensor 210. Specifically, in a case in which the second sensor 210 is an acceleration sensor, the arithmetic processing unit 260 may generate as the second detection information a signal having a resolution or bit rate thereof lowered further than the signal detected in the second sensor 210. For example, in a case in which the acceleration sensor performs data collection at 20

Hz, the arithmetic processing unit 260 may convert the data into 10-Hz data to generate the second detection information. Also, in a case in which the resolution of the data of the acceleration sensor is 16 bits, the arithmetic processing unit 260 may convert the data into 8-bit or 4-bit data to generate the second detection information.

Further, the second detection information may be various numerical values calculated by performing arithmetic processing on a signal detected in the second sensor 210. Specifically, in a case in which the second sensor 210 is an acceleration sensor, the arithmetic processing unit 260 may calculate a maximum or minimum value of a frequency and norms on the x, y, and z axes of a signal detected in the second sensor 210 and generate the calculated values as the second detection information. Further, the arithmetic processing unit 260 may extract only a specific axial component from among the respective components on the x, y, and z axes of the signal detected in the second sensor 210 to generate the second detection information. For example, the arithmetic processing unit 260 may extract the component in the gravitational direction and the component in the horizontal direction of the signal detected in the second sensor 210 to generate the second detection information. Further, the arithmetic processing unit 260 may calculate the degree of randomness of the signal detected in the second sensor 210 and generate, as second detection information, information as to whether or not the calculated degree of randomness exceeds a threshold value.

As described above, the second detection information generated in the arithmetic processing unit 260 based on the signal detected in the second sensor 210 is information obtained by partially thinning out, partially cutting out, or arithmetically processing the actual data (so-called raw data) collected in the second sensor 210. With such a configuration, the arithmetic processing unit 260 can further reduce the amount of information transmitted and received via the local communication units 230 and 130. According to this configuration, since the communication volume between the local communication units 230 and 130 can be reduced, the information processing apparatuses 100 and 200 can suppress power consumption.

As described above, the second detection information generated in the arithmetic processing unit 260 may be information obtained by partially thinning out, partially cutting out, or arithmetically processing the actual data. On the other hand, the second detection information may include the entirety of the actual data. That is, the arithmetic processing unit 260 may change the information amount of the second detection information to be transmitted and received in accordance with information required in distinction of the gesture input. For example, in a case in which a large amount of information is required in distinction of the gesture input, the arithmetic processing unit 260 may increase the information amount of the second detection information to improve the accuracy of the gesture distinction. Also, in a case in which the amount of information required in distinction of the gesture input can be small, the arithmetic processing unit 260 reduces the amount of the second detection information, which enables power consumed during communication to be suppressed.

The content of the second detection information to be generated may be specified in the information request unit 140. In a case in which the arithmetic processing unit 260 is to generate the second detection information specified in the information request unit 140, the information processing apparatus 200 can output the second detection information having an appropriate content required in the gesture distinction via the local communication units 230 and 130 to the information processing apparatus 100.

Accordingly, for example, since the arithmetic processing unit 260, the information request unit 140, the local communication units 130 and 230, the processing determination unit 150, and the like can perform processing according to the requirement without performing excessive processing, the information processing apparatuses 100 and 200 can suppress overload of each component and suppress power consumption.

The arithmetic processing unit 260 may be a processor such as a CPU, a control board or the like on which a processor and a storage element such as a memory are mounted, a DSP, or a hardware (HW) circuit. Also, the arithmetic processing unit 260 may be a combination of those described above. Further, the arithmetic processing unit 260 may be a general-purpose information processing apparatus such as a personal computer (PC). The processor of the arithmetic processing unit 260 executes arithmetic processing based on a predetermined program to enable the various functions described above to be fulfilled.

As described above, the information processing apparatuses 100 and 200 according to the present embodiment can detect a movement of the user 1 such as a gesture and use the movement as a command. Therefore, even in a case in which an operation input unit such as a button cannot be provided in the information processing apparatuses 100 and 200, the user 1 can easily operate the information processing apparatuses 100 and 200 by means of the movement. Also, even in a case in which an operation input unit such as a button is provided in the information processing apparatuses 100 and 200, the button cannot visually be recognized in the information processing apparatuses 100 and 200 worn on both the ears, and the operation will be in a blind and troublesome manner. According to the present embodiment, in such information processing apparatuses 100 and 200, the movement of the user 1 such as a gesture can be used as a command, and the operability of the user 1 can thus be improved.

[3. Processing Operation of Information Processing Apparatus]

Figure 4:
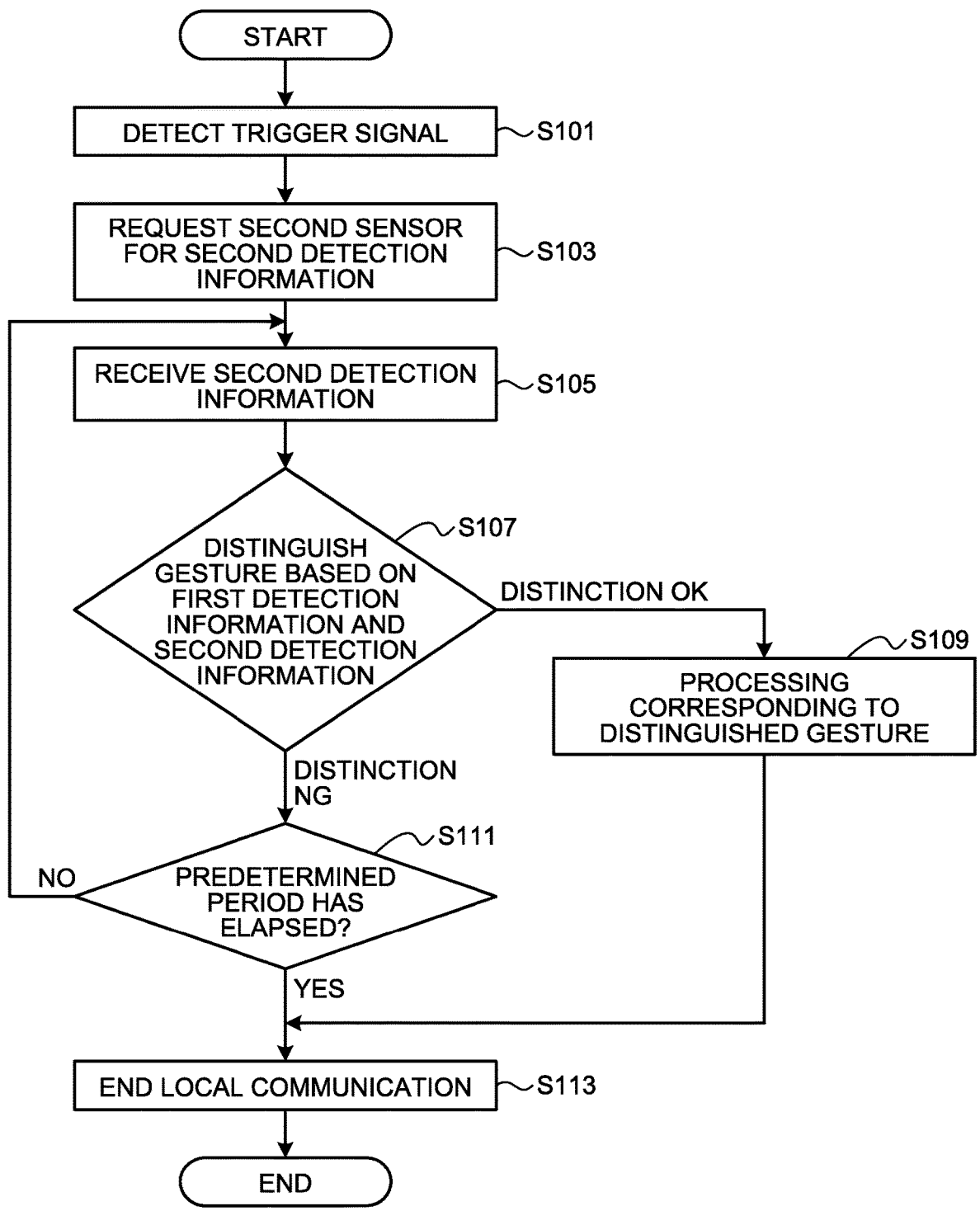
FIG. 4 is a flowchart illustrating an operation example of the information processing apparatus according to the embodiment.

Next, an operation flow of the information processing apparatuses 100 and 200 according to the present embodiment will be described with reference to FIG. 4. FIG. 4 is a flowchart illustrating a flow from a time when the information processing apparatus 100 detects a trigger signal to a time when local communication between the information processing apparatuses 100 and 200 ends.

First, a gesture input is performed by the user 1, and the first sensor 110 provided in the information processing apparatus 100 detects a trigger signal (S101).

Subsequently, the information request unit 140 that has determined the detection of the trigger signal requests the second sensor 210 or the arithmetic processing unit 260 provided in the information processing apparatus 200 for second detection information. This request is made via the local communication units 130 and 230 (S103).

Subsequently, the second sensor 210 or the arithmetic processing unit 260 transmits the requested second detection information to the information processing apparatus 100 via the local communication units 130 and 230. The local communication unit 130 receives the second detection information and outputs the received second detection information to the processing determination unit 150 (S105).

Subsequently, the processing determination unit 150, into which the second detection information has been input, distinguishes the gesture based on the second detection information and first detection information based on the signal detected in the first sensor 110 (S107).

At this time, in a case in which the gesture can be distinguished (S107/distinction OK), the processing determination unit 150 determines processing corresponding to the distinguished gesture. Thereafter, the processing determination unit 150 causes the sound output units 120 and 220 provided in the information processing apparatuses 100 and 200 to perform the determined processing (S109).

On the other hand, in a case in which the gesture cannot be distinguished (S107/distinction NG), the processing determination unit 150 determines whether or not a predetermined period has elapsed (S111). In a case in which the predetermined period has not elapsed (S111/No), the processing determination unit 150 continuously receives the second detection information and distinguishes the gesture again based on the second detection information that has been continuously received and the first detection information. That is, the information processing apparatuses 100 and 200 repeatedly execute the operations in S105 and S107 until the predetermined period elapses.

In a case in which the processing determination unit 150 determines that the predetermined period has elapsed (S111/Yes), or in a case in which the processing determination unit 150 determines processing corresponding to the gesture (S109), the processing determination unit 150 ends the communication between the local communication units 130 and 230 (S113). After the above operations, the information processing apparatuses 100 and 200 end the entire processing.

In the operation flow described above, the information processing apparatuses 100 and 200 can detect a gesture and perform processing corresponding to the gesture.

(3.1. Case in which Second Sensor is Activated Before Detection of Trigger Signal)

Figure 5:
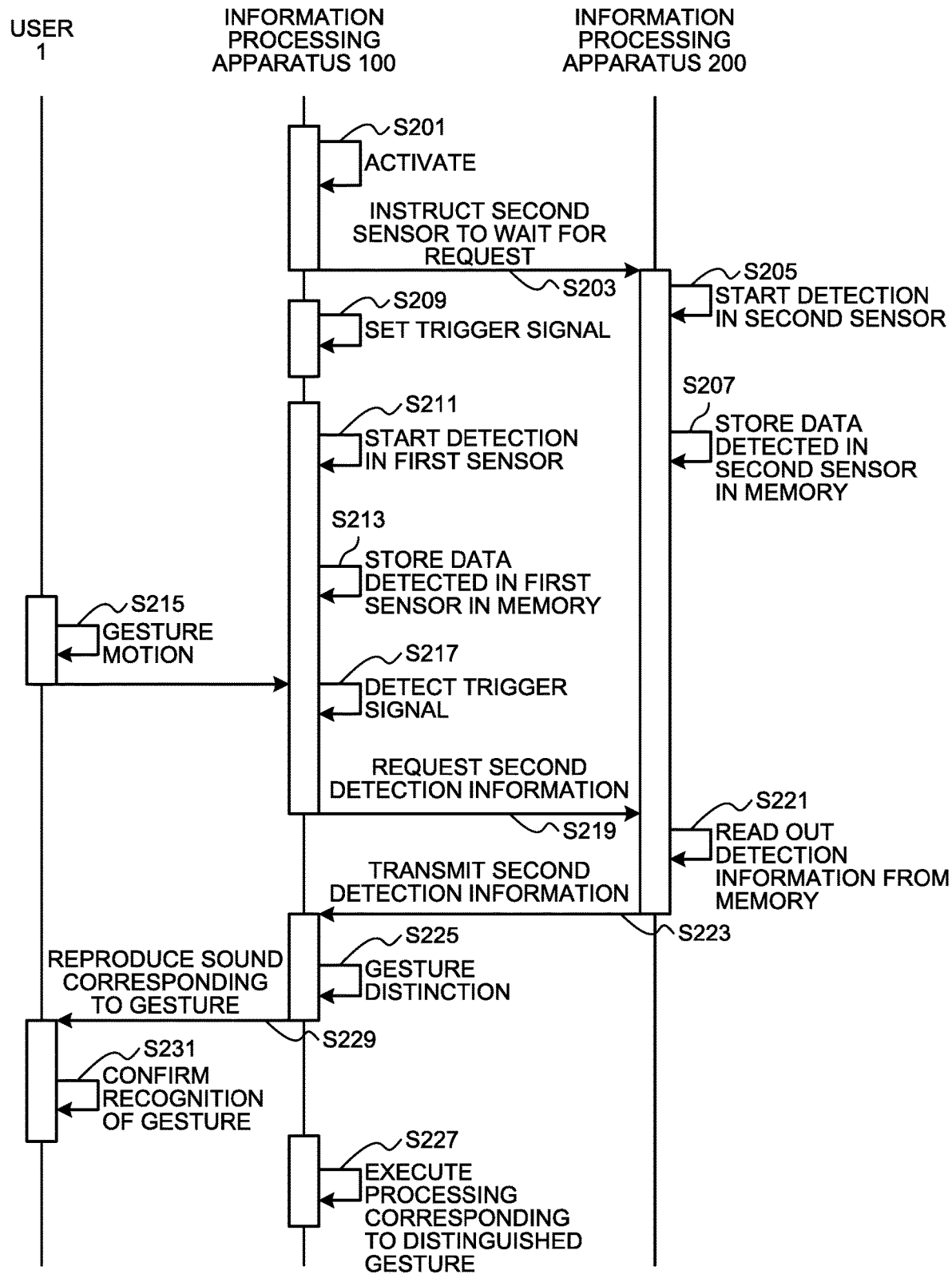
FIG. 5 is a sequence diagram illustrating a more detailed operation example of the information processing apparatus according to the embodiment.

In the operation flow in FIG. 4, the flow from the start to the end of the operations of the information processing apparatuses 100 and 200 has been described. In FIG. 5, linking of the operations among the information processing apparatuses 100 and 200 and the user 1 will be described in detail. The operation example illustrated in FIG. 5 is characterized in that the second sensor 210 is driven before the information request unit 140 provided in the information processing apparatus 100 requests information.

Referring to FIG. 5, first, a power button or the like provided on the information processing apparatus 100 is pressed to cause the information processing apparatus 100 to be activated (S201).

Subsequently, after activation, the information processing apparatus 100 instructs the second sensor 210 to wait for an information request via the local communication units 130 and 230 (S203).

Subsequently, in the information processing apparatus 200, the second sensor 210, which has received the instruction to wait for the information request, starts signal detection (S205).

After starting the signal detection, the second sensor 210 temporarily stores detected data in a memory or the like (S207). Here, the period in which the second sensor 210 stores the signal may be a predetermined period. That is, the second sensor 210 temporarily stores the detected past signal as a log for a predetermined period.

On the other hand, in the information processing apparatus 100, after instructing the second sensor 210 to wait for the information request, setting for the trigger signal is performed. In the setting for the trigger signal, conditions for detection of the trigger signal from among data collected in the first sensor 110 are set (S209).

After the setting for the trigger signal, the first sensor 110 starts signal detection (S211).

The first sensor 110 temporarily stores detected data in a memory or the like in a similar manner to the second sensor 210 (S213). That is, the first sensor 110 temporarily stores the detected past signal as a log for a predetermined period. Through the above operations, preparations for detecting a gesture motion by the user 1 in the information processing apparatuses 100 and 200 are completed.

At this moment, the user 1 performs a gesture motion (S215).

The information request unit 140 detects a trigger signal from the signals collected in the first sensor 110 (S217). The trigger signal is, for example, a signal resulting from the gesture performed by the user 1.

After the trigger signal is detected, the information request unit 140 requests the information processing apparatus 200 for second detection information (S219).

The arithmetic processing unit 260, which has been requested for the second detection information from the information request unit 140, reads out a signal from the memory of the second sensor 210 and generates the second detection information based on the read signal (S221).

Thereafter, the arithmetic processing unit 260 transmits the second detection information to the information processing apparatus 100 via the local communication units 230 and 130 (S223).

The processing determination unit 150, which has received the second detection information, distinguishes classification of the gesture motion performed by the user 1 based on first detection information and the second detection information (S225).

Thereafter, in accordance with the distinguished classification of the gesture motion, the processing determination unit 150 causes the sound output units 120 and 220 to perform sound reproduction corresponding to the gesture motion. As a result, a sound corresponding to the gesture motion is reproduced to the user 1 (S229).

Hence, the user 1 can confirm that the gesture motion has been recognized (S231).

Thereafter, the processing determination unit 150 causes the sound output unit 120 or the information processing apparatus 100 to execute processing corresponding to the distinguished gesture motion.

In the above-described operation example, immediately after the information processing apparatus 100 is activated, the information processing apparatus 100 issues the instruction to the second sensor 210 to wait for the information request. In response to this instruction, the second sensor 210 starts signal detection, temporarily stores the detected data in the memory or the like for the predetermined period, and waits for reception of the request for the second detection information. Therefore, since the detected data is accumulated in the second sensor 210 before the second sensor 210 receives the information request from the information request unit 140, the information request unit 140 can acquire the second detection information based on the signal detected before the information request unit 140 requests information.

For example, the first detection information and the second detection information may include information respectively detected in the first sensor 110 and the second sensor 210 at the same time. Since past sensor data such as the second detection information detected before the information request is requested, two or more pieces of data detected at the same time in separate sensors in separate housings, such as the first sensor 110 and the second sensor 210, can be used for detecting a single gesture. Consequently, since the single gesture can be distinguished with use of a plurality of pieces of detection information, the accuracy of the gesture distinction can be improved.

Further, the time when the first detection information and the second detection information are detected in the first sensor 110 and the second sensor 210 may correspond to the time when the trigger signal is detected. Consequently, since the information processing apparatus 100 can use a plurality of pieces of detection information such as the first detection information and the second detection information for the distinction of the gesture motion with use of the trigger signal, the accuracy of the gesture distinction can be improved.

Accordingly, since the information processing apparatus 100 can distinguish the gesture motion based on the signals collected before and after the detection of the trigger signal, the accuracy of the gesture motion distinction in the processing determination unit 150 can be improved further than in a case of using only the first sensor 110.

(3.2. Case in which Second Sensor is Activated after Detection of Trigger Signal)

Next, a flow of another operation example that is different from the operation example illustrated in FIG. 5 will be described with reference to FIG. 6. The operation example illustrated in FIG. 6 is characterized in that the second sensor 210 starts driving at a time when the information request unit 140 provided in the information processing apparatus 100 requests information.

Figure 6:
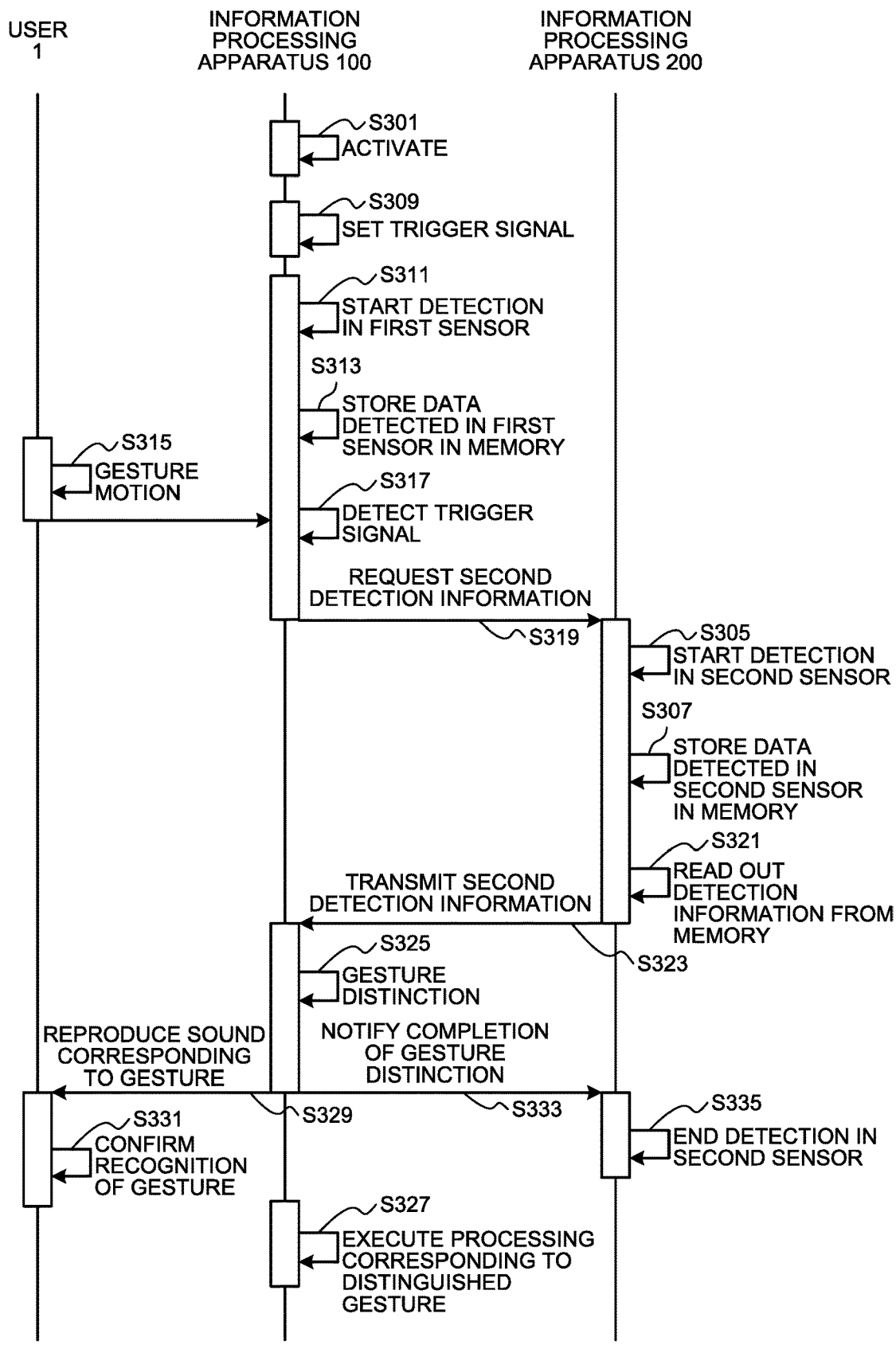
FIG. 6 is a sequence diagram illustrating another more detailed operation example of the information processing apparatus according to the embodiment.

Referring to FIG. 6, first, a button or the like provided on the information processing apparatus 100 is pressed to cause the information processing apparatus 100 to be activated, in a similar manner to the operation example in FIG. 5 (S301).

Subsequently, in the information processing apparatus 100, setting for the trigger signal is performed. In the setting for the trigger signal, conditions for detection of the trigger signal from among data collected in the first sensor 110 are set (S309).

After the setting for the trigger signal, the first sensor 110 starts signal detection (S311).

The first sensor 110 temporarily stores detected data in a memory or the like (S313). Here, the period in which the data is temporarily stored in the memory or the like may be a predetermined period. That is, the first sensor 110 may temporarily store the detected past signal as a log for a predetermined period. Through the above operations, preparations for detecting a gesture motion by the user 1 in the information processing apparatus 100 are completed.

At this moment, the user 1 performs a gesture motion (S315).

The information request unit 140 detects a trigger signal from the signals collected in the first sensor 110 (S317).

After the trigger signal is detected, the information request unit 140 requests the information processing apparatus 200 for second detection information (S319).

The second sensor 210, which has received the information request, starts signal detection (S305).

The data detected in the second sensor 210 is temporarily stored in a memory or the like (S307). Here, the period in which the data is temporarily stored in the memory or the like may be a predetermined period.

Subsequently, the arithmetic processing unit 260 reads out a signal from the memory of the second sensor 210, generates second detection information based on the read signal, and then transmits the second detection information to the information processing apparatus 100 via the local communication units 230 and 130 (S323).

The processing determination unit 150, which has received the second detection information, distinguishes classification of the gesture motion performed by the user 1 based on first detection information and the second detection information (S325).

In a case in which the distinction of the gesture motion in the processing determination unit 150 is completed, the information processing apparatus 100 reproduces a sound corresponding to the distinguished gesture motion to the user 1 (S329).

Hence, the user 1 can confirm that the gesture motion has been recognized (S331).

In addition, in a case in which the distinction of the gesture motion in the processing determination unit 150 is completed, the information processing apparatus 100 notifies the information processing apparatus 200 of the completion of the distinction of the gesture motion (S333).

The information processing apparatus 200, which has received the notification of the completion of the distinction of the gesture motion, ends the signal detection in the second sensor 210 (S335).

Thereafter, the processing determination unit 150 causes the sound output unit 120 or the information processing apparatus 100 to execute processing corresponding to the distinguished gesture motion (S327).

In the operation example described above, the second sensor 210 does not start signal detection until the information processing apparatus 100 requests the information processing apparatus 200 for the second detection information. According to this operation, since the second sensor 210 is driven in response to the detection of the trigger signal in the first sensor 110, load for driving the second sensor 210 can be reduced. Accordingly, the information processing apparatus 200 can reduce power consumption.

(3.3. Case in which Gesture Distinction is Performed Plural Times)

Next, a flow of still another operation example that is different from the operation examples illustrated in FIGS. 5 and 6 will be described with reference to FIG. 7. The operation example illustrated in FIG. 7 is characterized in that the information processing apparatus 100 distinguishes a gesture motion in a simple manner and, in a case in which the gesture motion is not distinguished in the simple distinction, requests the information processing apparatus 200 for information.

Figure 7:
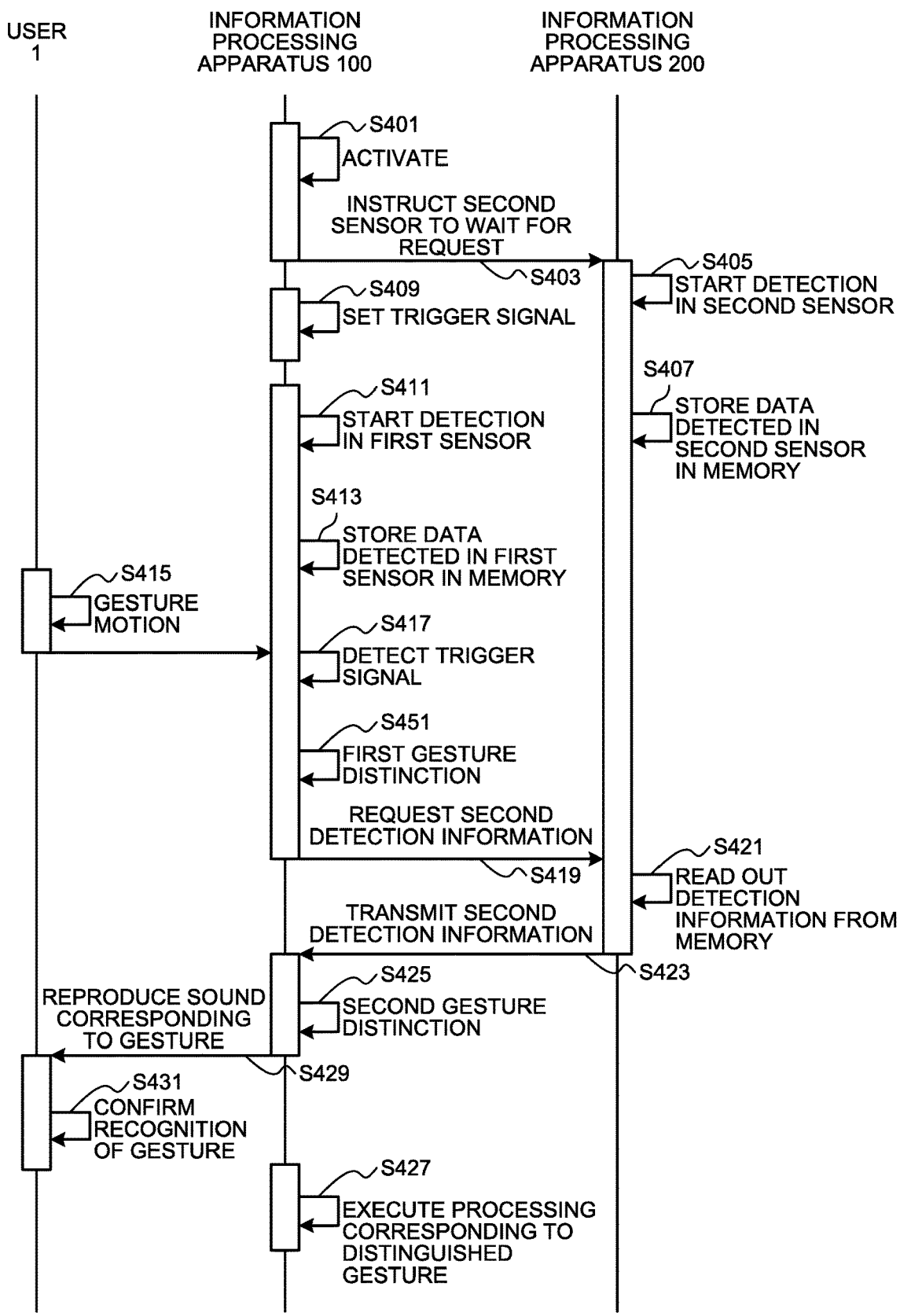
FIG. 7 is a sequence diagram illustrating another more detailed operation example of the information processing apparatus according to the embodiment.

Referring to FIG. 7, first, a button or the like provided on the information processing apparatus 100 is pressed to cause the information processing apparatus 100 to be activated (S401).

Subsequently, after activation, the information processing apparatus 100 instructs the second sensor 210 to wait for an information request via the local communication units 130 and 230 (S403).

Subsequently, in the information processing apparatus 200, the second sensor 210, which has received the instruction to wait for the information request, starts signal detection (S405).

After starting the signal detection, the second sensor 210 temporarily stores detected data in a memory or the like (S407). Here, the period in which the data is temporarily stored may be a predetermined period. That is, the second sensor 210 may temporarily store the detected past signal as a log for a predetermined period.

On the other hand, in the information processing apparatus 100, after instructing the second sensor 210 to wait for the information request, setting for the trigger signal is performed. In the setting for the trigger signal, conditions for detection of the trigger signal from among data collected in the first sensor 110 are set (S409).

After the setting for the trigger signal, the first sensor 110 starts signal detection (S411).

The data detected in the first sensor 110 is temporarily stored in a memory or the like (S413). Here, the period in which the data is temporarily stored may be a predetermined period. That is, the first sensor 110 may temporarily store the detected past signal as a log for a predetermined period in a similar manner to the second sensor 210.

At this moment, the user 1 performs a gesture motion (S415).

The information request unit 140 detects a trigger signal from the signals collected in the first sensor 110 (S417).

After the detection of the trigger signal, the processing determination unit 150 performs first gesture distinction (S451). The gesture distinction at this time is simple distinction based on the first detection information collected in the first sensor 110.

In a case in which the gesture motion cannot be distinguished in the simple distinction, the information processing apparatus 100 requests the information processing apparatus 200 for second detection information (S419).

Meanwhile, in a case in which the gesture motion can be distinguished in the simple gesture distinction, the information processing apparatus 100 may reproduce a sound corresponding to the distinguished gesture motion to the user 1 (S429). Thereafter, the processing determination unit 150 may cause the sound output unit 120 or the information processing apparatus 100 to execute processing corresponding to the distinguished gesture motion (S427).

The arithmetic processing unit 260, which has been requested for the second detection information from the information request unit 140, reads out a signal from the memory of the second sensor 210 and generates the second detection information based on the read signal (S421).

Thereafter, the arithmetic processing unit 260 transmits the second detection information to the information processing apparatus 100 via the local communication units 230 and 130 (S423).

The processing determination unit 150, which has received the second detection information, performs second gesture distinction based on the second detection information and the first detection information (S425). In this manner, the processing determination unit 150 can perform the gesture distinction with higher accuracy by adding information and performing the gesture distinction a plurality of times.

In a case in which the distinction of the gesture motion by the processing determination unit 150 is completed, the information processing apparatus 100 reproduces a sound corresponding to the distinguished gesture motion to the user 1 (S429).

Hence, the user 1 can confirm that the gesture motion has been recognized (S431).

Thereafter, the processing determination unit 150 causes the sound output unit 120 or the information processing apparatus 100 to execute processing corresponding to the distinguished gesture motion (S427).

In the above-described operation example, the information processing apparatus 100 first performs the first gesture distinction based on the first detection information. The gesture motion may be distinguished in the first gesture distinction. However, in a case in which it is difficult to perform reliable distinction, the information processing apparatus 100 further requests the second detection information and performs the second gesture distinction based on the first detection information and the second detection information. According to this operation, the information processing apparatus 100 can perform gesture distinction more quickly by performing simple gesture distinction with use of only the first detection information.

Also, in a case in which the gesture motion can be distinguished in the first simple gesture distinction, the processing determination unit 150 may omit the operation related to the second gesture distinction and determine processing to be executed by means of only the first gesture distinction. This enables quick gesture distinction. Also, according to this operation, since the communication between the information processing apparatuses 100 and 200 can be omitted, the information processing apparatuses 100 and 200 can suppress power consumption.

The operation examples in the sound reproduction apparatus serving as an example of the present embodiment have been described above with reference to FIGS. 5 to 7. However, the technique according to the present disclosure is not limited to these examples. The technique according to the present disclosure may be used for any type of terminal. Further, the trigger signal is not limited to a change in acceleration or the like caused by a gesture of the user 1 but may be predetermined voice or a predetermined input by the user 1. Specifically, the trigger signal may be a proximity sensor, pressing of a switch such as a button, a predetermined voice command, or start of a voice user interface (UI) session using a voice agent function. For example, in the information processing apparatus 100 having a voice UI, notifying a user of arrival of news, a message, or the like may be used as a predetermined trigger signal. In such a case, such notification may trigger start of signal detection in the second sensor 210 of the information processing apparatus 200.

Also, processing determined in the processing determination unit 150 is not limited to sound reproduction. For example, the processing determined in the processing determination unit 150 may be processing regarding video content, and the output destination of the processing is not particularly limited. For example, a loudspeaker or the like that executes sound reproduction or the like may be the output destination of the processing, or an external device such as a smartphone may be the output destination of the processing.

[4. Modification Examples]

Although the above description has been provided, taking the case in which the information processing apparatuses 100 and 200 according to the present embodiment are wearable terminals or the like as an example, the technique according to the present disclosure is not limited to such an example. The technique according to the present disclosure can also be applied to, for example, a stationary voice terminal. Hereinbelow, as a first modification example, an operation flow of a stationary voice terminal will be described with reference to FIG. 8.

First Modification Example: Microphone

The first modification example is an example in which the first sensor 110 and the second sensor 210 are microphones, and in which the information processing apparatuses 100 and 200 detect voice. Specifically, a keyword such as "lighting-up" is set as an input from the user 1, and the information processing apparatuses 100 and 200 determine processing to be executed by voice-recognizing the keyword. For example, in a case in which the information processing apparatuses 100 and 200 recognize the keyword "lighting-up", the information processing apparatuses 100 and 200 may issue output of turning on a room light.

Figure 8:
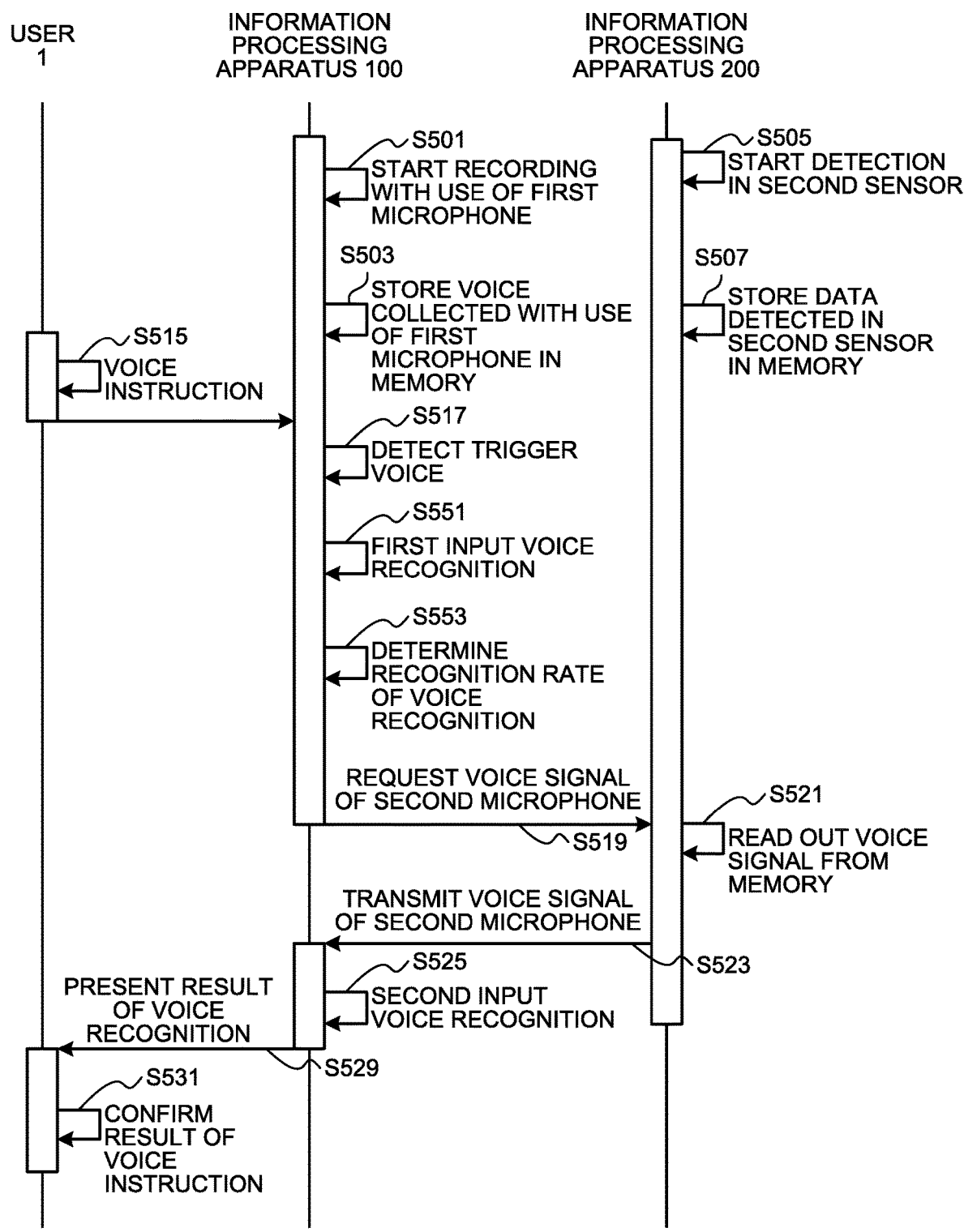
FIG. 8 is a sequence diagram illustrating an operation example of an information processing apparatus according to a modification example.

Referring to FIG. 8, first, recording with use of a first microphone (corresponding to the aforementioned first sensor 110) is started (S501).

Subsequently, voice collected with use of the first microphone is temporarily stored in a memory or the like (S503).

At this moment, a voice instruction is issued by the user 1 (S515). Note that the voice instruction by the user 1 may include below-mentioned trigger voice and instruction voice indicating an instruction to an information processing apparatus (corresponding to the aforementioned information processing apparatus 100).

The information processing apparatus detects trigger voice (S517). For example, the trigger voice may be a specific keyword such as "recognition start" for causing the information processing apparatus to start voice recognition.

At this moment, the processing determination unit 150 performs first input voice recognition for the instruction voice by the user 1 (S551).

Subsequently, the processing determination unit 150 determines a recognition rate of voice recognition for the instruction voice (S553).

As a result of this determination, in a case in which the recognition rate of voice recognition for the instruction voice is less than a threshold value, the information request unit 140 further requests a second microphone (corresponding to the aforementioned second sensor 210) for second voice information including the instruction voice by the user 1 (S519).

The arithmetic processing unit 260, which has received the request for voice information, reads out a voice signal collected with use of the second microphone from a memory and generates second voice information based on the read voice signal (S521).

Thereafter, the second voice information is transmitted to the processing determination unit 150 via the local communication units 230 and 130 (S523).

The processing determination unit 150 performs second input voice recognition based on first voice information including the voice signal collected with use of the first microphone and the second voice information collected with use of the second microphone (S525).

As a result, the processing determination unit 150 presents a result of the voice recognition for the instruction voice from the user 1 (S529). For example, in a case in which the instruction voice from the user 1 is "lighting-up", the information processing apparatus executes processing of turning on a room light by recognizing the keyword "lighting-up".

Therefore, the user 1 can confirm that the result of the voice instruction has been executed (S531).

As described above, in the present modification example, an operation example of the information processing apparatus that performs voice recognition for a voice instruction has been described. With such an operation, the user 1 can cause the information processing apparatus to perform an operation according to the user's voice instruction.

Second Modification Example: Head Mounted Display

A second modification example is an example in which the information processing apparatuses 100 and 200 are not sound reproduction apparatuses but head mounted displays (HMDs). For example, a case in which the information processing apparatuses 100 and 200 are HMDs for viewing virtual reality (VR) content or the like will be described. For viewing the VR content, the HMD is provided with a sensor detecting movement of the head such as an acceleration sensor and a gyro sensor, and the sensor is used, for example, to control an angle of view of an image in the VR content. However, in a case in which the user performs an input operation to the HMD while viewing the VR content, the user 1 cannot see the outside world, and it is thus desirable to perform the input operation without the need to use a remote controller or the like. For example, for the input operation using a gesture, it is desirable to use the acceleration sensor, the gyro sensor, or the like by switching the function of the sensor from the control of the angle of view.

The present embodiment can be applied to a technique in which the user 1 performs an input operation to the HMD by performing a gesture motion after a specific input to the HMD.

Specifically, in the HMD according to the present modification example, a proximity sensor may further be provided on one of the right and left housings. For example, in a case in which approach of the hand or the like of the user 1 is recognized by the proximity sensor of the HMD, the HMD may switch the function of the acceleration sensor or the gyro sensor in order for an input by means of a gesture motion to be recognized with use of the sensor. For example, the user 1 may be able to instruct the HMD to zoom in or zoom out or adjust the sound volume by inclining his/her head while putting his/her hand over the proximity sensor. While the input to the HMD is being performed by such a gesture motion, a signal detected in the acceleration sensor or the gyro sensor may or may not be used to control the angle of view of the VR content.

Although the preferred embodiment of the present disclosure has been described above in detail with reference to the attached drawings, a technical scope of the present disclosure is not limited to the present embodiment. It is obvious that a person with an ordinary skill in the art to which the present disclosure pertains can easily arrive at various alteration examples or modification examples within the scope of the technical idea disclosed in the patent claims, and it is to be understood that these examples fall within the technical scope of the present disclosure.

For example, in the above embodiment, although the case in which the information processing apparatuses 100 and 200 are sound reproduction apparatuses has been described as an example, the present technique is not limited to such an example. For example, the information processing apparatuses 100 and 200 may be stationary sound recognition apparatuses or wearable terminals such as a head mounted display.

Also, effects described herein are descriptive or illustrative, not limited. That is, the technique according to the present disclosure can exert other effects that are obvious to those skilled in the art based on the present description in addition to or instead of the above effects.

Meanwhile, the following configuration also falls within the technical scope of the present disclosure.

(1)

An information processing apparatus comprising:

an information request unit, in a case in which a predetermined trigger signal is detected in a first sensor, requesting second detection information based on a signal detected in a second sensor located at a different position from that of the first sensor;

a local communication unit receiving the second detection information; and a processing determination unit determining processing to be executed based on first detection information based on a signal detected in the first sensor and the second detection information.

(2)

The information processing apparatus according to (1), wherein the second detection information is a part of the signal detected in the second sensor.

(3)

The information processing apparatus according to (1) or (2), wherein the second detection information is information obtained by performing arithmetic processing on the signal detected in the second sensor.

(4)

The information processing apparatus according to any one of (1) to (3), wherein the second detection information has a smaller data amount than the first detection information.

(5)

The information processing apparatus according to any one of (1) to (4), wherein each of the first sensor and the second sensor includes a memory temporarily storing a detected signal by a predetermined amount.

(6)

The information processing apparatus according to any one of (1) to (5), wherein the second detection information includes information based on a signal detected in the second sensor before a time point when a request from the information request unit is received.

(7)

The information processing apparatus according to any one of (1) to (6), wherein the first detection information and the second detection information used by the processing determination unit include information respectively detected in the first sensor and the second sensor at equal time.

(8)

The information processing apparatus according to any one of (1) to (7), wherein the time when the first detection information and the second detection information are detected in the first sensor and the second sensor corresponds to time when the trigger signal is detected.

(9)

The information processing apparatus according to any one of (1) to (8), wherein the information request unit changes a type of the second detection information that the information request unit is to request based on a type of the trigger signal.

(10)

The information processing apparatus according to any one of (1) to (9), wherein the processing determination unit distinguishes classification of a corresponding input based on the first detection information and the second detection information and determines processing to be executed in accordance with the distinguished classification of the input.

(11)

The information processing apparatus according to (10), wherein the input is a gesture input.

(12)

The information processing apparatus according to (10) or (11), wherein the processing determination unit determines the classification of the input using a machine learning algorithm.

(13)

The information processing apparatus according to any one of (1) to (12), wherein the local communication unit performs wireless communication.

(14)

The information processing apparatus according to any one of (1) to (13), wherein the first sensor and the second sensor are provided in different housings.

(15)

The information processing apparatus according to (14), wherein the first sensor and the second sensor are provided in the housings worn on a right ear and a left ear, respectively.

(16)

The information processing apparatus according to any one of (1) to (15), wherein the first sensor and the second sensor are sensors of an equal type.

(17)

The information processing apparatus according to (16), wherein the first sensor and the second sensor are acceleration sensors.

(18)

The information processing apparatus according to any one of (1) to (17), wherein the local communication unit ends reception of the second detection information in a case in which the determination by the processing determination unit ends or in a case in which a predetermined period has elapsed.

(19)

An information processing method comprising:

in a case in which a predetermined trigger signal is detected in a first sensor, requesting second detection information based on a signal detected in a second sensor located at a different position from that of the first sensor;

receiving the second detection information; and determining, by means of an arithmetic processing device, processing to be executed based on first detection information based on a signal detected in the first sensor and the second detection information.

(20)

A program causing a computer to function as:

an information request unit, in a case in which a predetermined trigger signal is detected in a first sensor, requesting second detection information based on a signal detected in a second sensor located at a different position from that of the first sensor;

a local communication unit receiving the second detection information; and a processing determination unit determining processing to be executed based on first detection information based on a signal detected in the first sensor and the second detection information.

REFERENCE SIGNS LIST

1 USER
100, 200 INFORMATION PROCESSING APPARATUS
110 FIRST SENSOR
120, 220 SOUND OUTPUT UNIT
130, 230 LOCAL COMMUNICATION UNIT
140 INFORMATION REQUEST UNIT
150 PROCESSING DETERMINATION UNIT
210 SECOND SENSOR
260 ARITHMETIC PROCESSING UNIT

The invention claimed is:

1. An information processing apparatus comprising:
   an information request unit configured to transmit, based on a predetermined trigger signal detected in a first sensor located at a first position, a request to a second sensor located at a second position different from the first position to receive second detection information obtained based on a signal detected in the second sensor;
   a local communication unit configured to receive, from the second sensor, the second detection information only after the transmission of the request to the second sensor; and
   a processing determination unit configured to determine processing to be executed based on first detection information obtained based on a signal detected in the first sensor and the second detection information,
   wherein an amount of the second detection information received from the second sensor is changed based on an amount of information required to distinguish classification of a corresponding input,
   wherein the amount of the second detection information received from the second sensor is decreased based on a decrease in the amount of information required to distinguish classification of the corresponding input, and
   wherein the information request unit, the local communication unit, and the processing determination unit are each implemented via at least one processor.

2. The information processing apparatus according to claim 1, wherein the second detection information is a part of the signal detected in the second sensor.

3. The information processing apparatus according to claim 1, wherein the second detection information is obtained by performing arithmetic processing on the signal detected in the second sensor.

4. The information processing apparatus according to claim 1, wherein the second detection information has a smaller data amount than the first detection information.

5. The information processing apparatus according to claim 1, wherein each of the first sensor and the second sensor includes a memory temporarily storing a detected signal by a predetermined amount.

6. The information processing apparatus according to claim 5, wherein the second detection information includes information based on a signal detected in the second sensor before a time point when a request from the information request unit is received.

7. The information processing apparatus according to claim 6, wherein the first detection information and the second detection information used by the processing determination unit include information respectively detected in the first sensor and the second sensor at equal time.

8. The information processing apparatus according to claim 7, wherein times when the first detection information and the second detection information are detected in the first sensor and the second sensor corresponds to time when the predetermined trigger signal is detected.

9. The information processing apparatus according to claim 1, wherein the information request unit is further configured to change a type of the second detection information that the information request unit is to request based on a type of the predetermined trigger signal.

10. The information processing apparatus according to claim 1, wherein the processing determination unit is further configured to
   distinguish classification of the corresponding input based on the first detection information and the second detection information, and
   determine processing to be executed in accordance with the distinguished classification of the corresponding input.

11. The information processing apparatus according to claim 10, wherein the input includes a gesture input.

12. The information processing apparatus according to claim 10, wherein the processing determination unit is further configured to determine the classification of the input using a machine learning algorithm.

13. The information processing apparatus according to claim 1, wherein the local communication unit is further configured to perform wireless communication.

14. The information processing apparatus according to claim 1, wherein the first sensor and the second sensor are provided in different housings.

15. The information processing apparatus according to claim 14, wherein the first sensor and the second sensor are provided in the housings worn on a right ear and a left ear, respectively.

16. The information processing apparatus according to claim 1, wherein the first sensor and the second sensor are sensors of an equal type.

17. The information processing apparatus according to claim 16, wherein the first sensor and the second sensor are acceleration sensors.

18. The information processing apparatus according to claim 1, wherein the local communication unit ends the reception of the second detection information based on the determination by the processing determination unit ending or based on a predetermined period elapsing.

19. An information processing method comprising:
   transmitting, based on a predetermined trigger signal detected in a first sensor located at a first position, a request to a second sensor located at a second position different from the first position to receive second detection information obtained based on a signal detected in the second sensor;
   receiving, from the second sensor, the second detection information only after the transmission of the request to the second sensor; and
   determining processing to be executed based on first detection information obtained based on a signal detected in the first sensor and the second detection information,
   wherein an amount of the second detection information received from the second sensor is changed based on an amount of information required to distinguish classification of a corresponding input, and
   wherein the amount of the second detection information received from the second sensor is decreased based on a decrease in the amount of information required to distinguish classification of the corresponding input.

20. A non-transitory computer-readable medium having embodied thereon a program, which when executed by a computer to execute an information processing method, the method comprising:
   transmitting, based on a predetermined trigger signal detected in a first sensor located at a first position, a request to a second sensor located at a second position different from the first position to receive second detection information obtained based on a signal detected in the second sensor;

receiving, from the second sensor, the second detection information only after the transmission of the request to the second sensor; and determining processing to be executed based on first detection information obtained based on a signal detected in the first sensor and the second detection information, wherein an amount of the second detection information received from the second sensor is changed based on an amount of information required to distinguish classification of a corresponding input, and wherein the amount of the second detection information received from the second sensor is decreased based on a decrease in the amount of information required to distinguish classification of the corresponding input.

* * * * *